US006985753B2

(12) United States Patent
Rodriguez et al.

(10) Patent No.: US 6,985,753 B2
(45) Date of Patent: Jan. 10, 2006

(54) PORTABLE NAVIGATION AND COMMUNICATION SYSTEMS

(75) Inventors: Robert Michael Rodriguez, Boise, ID (US); William B. Rexrode, Boise, ID (US)

(73) Assignee: Dashsmart Investments LLC, Meridian, ID (US)

( * ) Notice: Subject to any disclaimer, the term of this patent is extended or adjusted under 35 U.S.C. 154(b) by 370 days.

(21) Appl. No.: 10/313,949

(22) Filed: Dec. 6, 2002

(65) Prior Publication Data

US 2003/0139150 A1    Jul. 24, 2003

Related U.S. Application Data

(60) Provisional application No. 60/343,367, filed on Dec. 21, 2001, provisional application No. 60/338,399, filed on Dec. 7, 2001.

(51) Int. Cl.
*H04M 1/00* (2006.01)
*H04B 1/38* (2006.01)
*H04B 7/185* (2006.01)

(52) U.S. Cl. .............................. 455/550.1; 455/556.2; 455/566; 455/575.9; 455/90.1; 455/12.1

(58) Field of Classification Search ................ 701/208, 701/213; 455/456, 566, 550.1; 345/1.1
See application file for complete search history.

(56) References Cited

U.S. PATENT DOCUMENTS

| | | |
|---|---|---|
| 5,389,934 A | 2/1995 | Kass |
| 5,528,248 A | 6/1996 | Steiner et al. |
| 5,797,089 A | 8/1998 | Nguyen |
| 5,877,724 A | 3/1999 | Davis |
| 5,943,018 A | 8/1999 | Miller |
| 6,083,353 A | 7/2000 | Alexander, Jr. |
| 6,374,177 B1 | 4/2002 | Lee et al. |
| 6,411,899 B2 | 6/2002 | Dussell et al. |
| 6,430,498 B1 | 8/2002 | Maruyama et al. |
| 6,434,485 B1 | 8/2002 | Beason et al. |
| 2001/0044321 A1 * | 11/2001 | Ausems et al. ............. 455/556 |
| 2002/0021258 A1 * | 2/2002 | Koenig ....................... 345/1.1 |
| 2002/0065111 A1 * | 5/2002 | Otsuka et al. .............. 455/566 |
| 2002/0152027 A1 * | 10/2002 | Allen ......................... 701/213 |
| 2003/0158657 A1 * | 8/2003 | Agnew et al. ............. 701/208 |
| 2005/0043056 A1 * | 2/2005 | Boesen .................... 455/550.1 |

OTHER PUBLICATIONS

Wrolstad, Jay, "Report: Telematics Slow to Take Off", *Wireless NewsFactor*, Oct. 2, 2002, 2 pages http://www-.wirelessnewsfactor.com/perl/printer/19562 [accessed Apr. 7, 2003].

* cited by examiner

Primary Examiner—Rafael Perez-Gutierrez
Assistant Examiner—Marisol Figueroa
(74) Attorney, Agent, or Firm—Robert A. Frohwerk

(57) ABSTRACT

Disclosed is a portable navigation and communication system. In one embodiment, the system combines within a single enclosure a GPS satellite-positioning unit, a means of mobile telephony using cell phone technology and a means of personal computing capable of wired or wireless internet/intranet access using a standard operating system. In one aspect of this embodiment, multiple displays can maintain functional independence of simultaneous operations and allow for fail-over to enhance reliability. Further, a speech recognition subsystem can also be included to provide a voice-activated, speech-controlled user interface for hands-free operation.

9 Claims, 2 Drawing Sheets

PORTABLE NAVIGATION AND COMMUNICATION SYSTEMS

CROSS-REFERENCE TO RELATED APPLICATIONS

This application claims the benefit of U.S. Provisional Patent Application No. 60/338,399, filed Dec. 7, 2001, entitled "Portable Navigation and Communication System;" and U.S. Provisional Patent Application No. 60/343,367, filed Dec. 21, 2001, entitled "Portable Navigation and Communication System," both of which are incorporated herein in their entireties by reference.

TECHNICAL FIELD

The following disclosure relates generally to methods and systems for navigation and communication.

BACKGROUND

Prior to the launch of the global positioning satellite (GPS) system, persons traveling on foot or by vehicle were effectively limited in their direction-finding means to a compass. Initially designed by the United States Departments of Defense and Transportation for military use only, the GPS system first became available on a subscription-like basis in 1978. Driven by demands for more accurate navigation, especially among commercial airlines, those restrictions were relaxed during the mid 1980's. That opening of the GPS system occurred as more satellites were launched, enabling greater accuracy for determining location. Good discussions of the workings of a GPS-based navigation system can be found in U.S. Pat. No. 5,528,248 and in U.S. Pat. No. 5,943,018. In April of 1995 the system, containing 24 operational satellites, was formally declared as having achieved full capability.

Since then, GPS receivers have gone the way of the Personal Computer (PC) before them. The advance of semiconductor technology has enabled more functionality to be offered in ever smaller and more power efficient packages at even lower costs. Formerly limited by size, power and cost constraints to vehicular mounts for commercial users, GPS receivers have become readily available and increasingly popular as a handheld means of determining location and direction of travel. Widespread use has developed beyond the earlier aviation and emergency services occupations to include people as varied as truck fleet operators, commercial fishermen, farmers and hikers.

Paralleling the development of handheld GPS receivers, but much more apparent to the casual observer, has been the development of the now ubiquitous cellular telephone. Not too many years ago, mobile telephony was restricted to localized operator-assisted paging systems and used primarily by medical personnel and other employees who were "on call"; the carrying of a pager projected an elite status to the one who carried it. In only a few years, cell phones have become so commonplace as to become regarded as a public nuisance, necessitating governmental restrictions as to where and how they may be used. Concerns have arisen over potential health risks related to the power being transmitted from phones held in close proximity to the human ear, and therefore near the brain. Being as yet unproved, the long-term health risks of hand-held cell phone usage have not drawn nearly as much attention as the immediate safety concerns of cell phones being used by operators of moving vehicles. Legislators concerned about traffic safety have banned the use of hand-held cell phones while operating motor vehicles in some states, and many more governmental bodies are considering similar restrictions. Phones offering hands-free operation alleviate most of the problems related to health and safety.

Of course, leading the way in the reduction in size and cost of computing power, the desktop PC has been reduced first to the laptop computer and beyond that to the Personal Digital Assistant (PDA) for handheld personal computing. Initially limited to use as an address book and calendar, the PDA is growing along with other computing devices in its ability to take on more complex tasks. The computer that was confined to the office a few years ago has been put into a coat pocket and taken out onto the street and into the airplane by the business traveler.

Some products have combined the cell phone with a PDA, as in U.S. Pat. No. 5,797,089, which gives a good discussion of related prior art and the Motorola Accompli™ series of products, among others. Davis in U.S. Pat. No. 5,877,724 has shown the merger of a cell phone with GPS, as also has the Garmin Corporation in their NavTalk product line. Inventor Miller showed in U.S. Pat. No. 5,943,018 one means of attaching a portable GPS receiver unit to the underside of a portable computer.

By 1994, Magneti Marelli, a subsidiary of Italian car manufacturer Fiat, had begun selling its Route Planner™ satellite navigation system, specifically designed for car drivers. Within a few years, General Motors had made their OnStar™ service available to motorists as protection in case their vehicle later became disabled. In 1998 Clarion, collaborating with Microsoft, introduced "AutoPC" with its ability to add accessories to support all of the functions of GPS, cell phone and PC, in addition to the audio entertainment that had become expected by many automobile owners and drivers. U.S. Pat. No. 6,374,177 is related to these functions and discusses a system allowing a person to update entertainment selections based on geographic location. A recent report, "Telematics: A Market Study of In-Vehicle Communications, Navigation, and Digital Radio" states that "Although Telematics has begun with operator-based services like those from OnStar™ and ATX, there will be a continual integration of other in-vehicle electronics to encompass entertainment, navigation, and E911 equipment . . . [which] are presently separate electronic systems." In U.S. Pat. No. 6,083,353, Alexander remarked, "hardware and software hurdles have limited the ability to utilize multicomponent data gathering systems in the field. Connecting equipment such as a GPS, a two-way radio, and a handheld pen computer for use in the field poses a number of obstacles. Many wires and cables work fine on a desktop computer but not on a handheld device." Further, Thilo Koslowski, lead automotive analyst and research director for the well known Gartner (G2) Group was reported in the Oct. 2, 2002 issue of Wireless NewsFactor as saying, "The results show that the industry is being misled by the idea that they have to push all information systems and replicate the PC experience in a vehicle, which is not a good idea."

DETAILED DESCRIPTION

Figure 1:
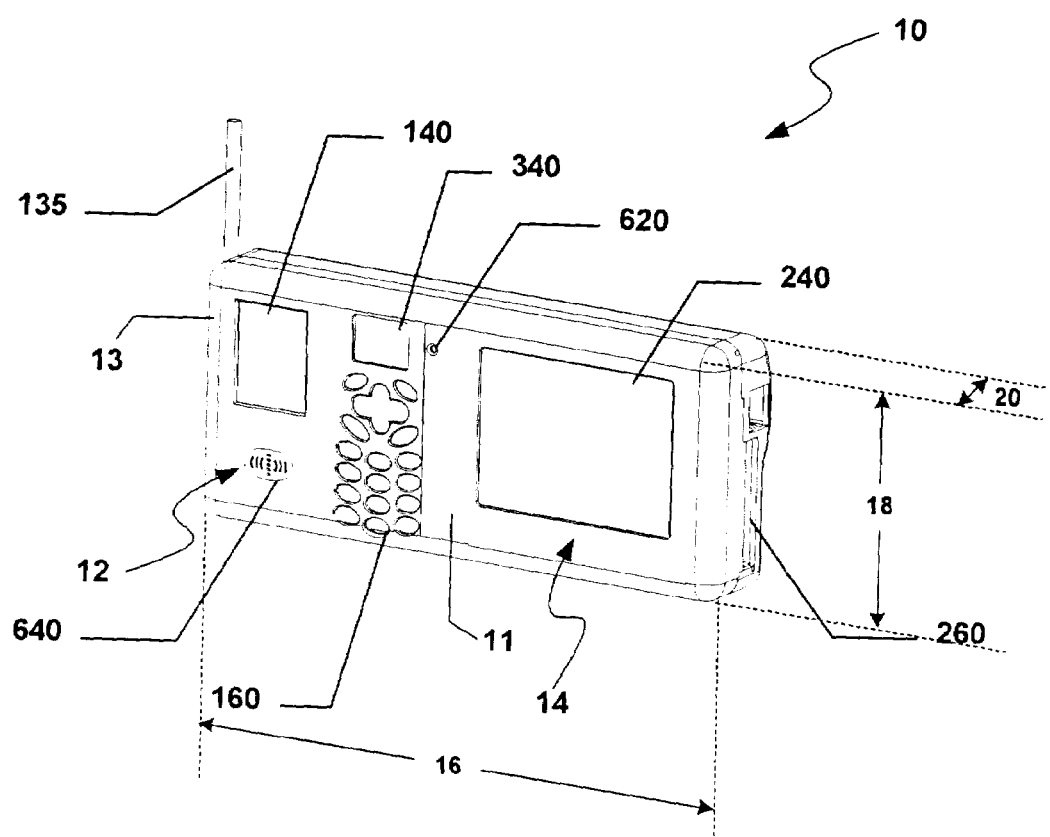
FIG. 1 is an isometric view of a Portable Navigation and Communication System (PNCS) configured in accordance with an embodiment of the invention.

The following description provides specific details for a thorough understanding of, and enabling description for, embodiments of the invention. However, one skilled in the art will understand that the invention may be practiced without these details. In other instances, certain structures and functions have not been shown or described in detail to avoid unnecessarily obscuring the description of the embodiments of the invention.

To achieve a multifunctional combination including a GPS, cell phone and PC, requires overcoming the initial problems of size, cabling and power requirements. Making a device small enough to accomplish the three-way combination in a single package brings into play other technical difficulties. One of these arises when the transmitting antenna of the relatively powerful cell phone is in close proximity to the sensitive GPS receiving antenna. Other considerations involve eliminating external interconnecting cables and providing hands-free and heads-up capability in response to safety and regulatory requirements.

Because of the multifunctional nature of the system and device that embody the present invention, it touches on multiple fields. However, the combined functions that are described here as residing within a single unit contribute synergisms not recognized by devices known in the prior art. Indeed, some industry experts are currently teaching away from the combination of functions even for automotive use.

Furthermore, it is believed that attempts to couple modules to achieve a multifunctional device would likely do so with a mindset toward reduction of manufacturing costs. This expectation is supported by the fact that announced, but yet to be delivered, handheld products are moving toward larger displays in order to offer capability more nearly that which has become expected in the desktop personal computing environment. It stands to reason then that among the first casualties of a multifunctional approach would be a reduction of display components to provide only one common display for all functions and modes. This can be seen in products, such as Garmin's NavTalk II, that purport to offer multifunctionality. They have chosen to consolidate their visual output into a single display, whether for reduction of costs, to accommodate an established form factor, or for some other reason. The present invention suggests that this consolidation of displays is misguided as it sacrifices ease of use and reliability, if not safety. Contrary to the expected norm, the advantages of multiple displays may offset, and indeed may exceed, the material cost involved.

In one embodiment of the present invention, a personal navigation and communications device includes multiple displays housed in a single enclosure with a personal computing means. In an aspect of this embodiment, the device comprises a satellite positioning unit, a cellular phone as a mobile telephone unit, and a personal digital assistant (PDA) unit. The capability and performance of the satellite positioning unit, implemented in a GPS module, can be enhanced by an electronic compass. Each of the compass, the phone, and the PDA has its own primary display module. The larger display, normally associated with the PDA, can include a touchscreen. An integrated keypad enables manual entry of other data and menu-driven commands. A microphone receives sound which is analyzed by a Speech Recognition Unit to provide an alternate means of data entry in support of hands-free operation. A speaker provides audible output, including synthesized speech as well as a means of delivering audio entertainment. The PDA module can use an industry standard operating system and supports industry standard removable data storage. The PDA can also include network and port connections for access to the Internet, beyond the wireless modem capability attached to the cell phone. An additional special-purpose microprocessor can work in conjunction with the PDA. All functions are electronically interconnected without external cables so as to share memory and displays. The device also includes a power supply to support all functions. An internal battery enables portability and may be assisted by accessory power from an automobile or other vehicle, or by a panel of solar cells through standard external power connectors. Wherever possible, industry standards are maintained through the use of commonly available modules and components.

Embodiments of the present invention provide a device that can improve over the prior art in at least some of the following areas:
  (a) it combines all of the functions of a GPS, a cell phone and a PDA into a single portable package small enough that it can be carried in a coat pocket;
  (b) it offers ease of use, and improved system reliability, by retaining separate displays for the various functions; and
  (c) it increases system reliability by reducing the overall number of components through the sharing of memory, data storage, power supply and other non-display items;
  (d) it offers hands-free operation that can alleviate problems related to health and safety; and
  (d) it offers a wireless port for additional PC hardware.

By virtue of being portable, a device designed under embodiments of the present invention:
  (a) can be mounted in a motorized vehicle whether a car, truck, bus, boat, or airplane;
  (b) can be moved from one vehicle to another, say from a weekday commute car to a weekend recreational vehicle;
  (c) can be removed from a vehicle that has been sold for continued use in another replacement vehicle;
  (d) can be carried from home or car into the high-rise buildings of town center or into remote areas such as the desert or mountains, or taken off-road to waterways such as lakes, rivers, or ocean; and
  (e) can be upgraded without requiring modification outside of itself.

Due to the inclusion of multiple displays under control of a common processor having shared memory, a device under embodiments of the present invention:
  (a) offers greater ease of use by simultaneously displaying phone information on a smaller display without interfering with mapping, calendar or other information on another larger display;
  (b) offers greater ease of use and safety by allowing more comprehensive phone information to be automatically presented on the larger display when that display is not otherwise in use, so as to overcome the need for multiple screens or scrolling on the smaller display;
  (c) offers greater reliability by allowing that same phone information to move automatically to the larger display in case of failure of the smaller display which is dedicated to the phone; and
  (d) offers increased battery life by being able to selectively power-down unused displays.

Embodiments of the present invention are described below with reference to the accompanying drawings. As noted previously, the devices of this invention are disclosed here with particular reference to a Portable system for Navigation and Communication. While the basic operation will be described in detail, the disclosed system includes allowance for connection through industry standard interfaces to other devices, thereby enabling functionality that will be readily recognized by those skilled in the art though such a detailed description is not given here.

FIG. 1 depicts an isometric view of a Portable Navigation and Communication System (PNCS) 10 configured in accordance with an embodiment of the invention. The following description is best understood by noting the layout of controls, displays and other features on an operational surface or control panel 11 of the PNCS 10. In particular, notice that the control panel 11 is divided into regions according to various functions. A cell phone region 12 with its controls and small graphical display are positioned generally to the left, whereas a PDA region 14 with a larger, touchscreen display 240 is positioned generally to the right. A compass-specific display 340 and a microphone pickup 620 are positioned near the top center on the face of the PNCS 10, to reduce the likelihood of being obscured by an operator's hand. Placement of the PDA on the right facilitates use (with preference given to right-handed people) of the touchscreen 240, without interfering with the less frequently accessed phone controls or display in the cell phone region 12. In other embodiments, alternative layout configurations are possible to meet the needs of specific markets such as environmentally hardened, waterproofed, and/or preference for left-handed operation.

In one aspect of this embodiment, the PNCS 10 can be housed in an enclosure 13 which is easily portable by a person. For example, the enclosure 13 can have a width dimension 16, a height dimension 18, and a thickness dimension 20. In one embodiment, the width dimension 16 can be less than about 10 inches, the height dimension 18 can be less than about 5 inches, and the thickness dimension 20 can be less than about 3 inches. In other embodiments, these dimensions can have other values. For example, in another embodiment, the width dimension 16 can be less than about 9 inches, the height dimension 18 can be less than about 4 inches, and the thickness dimension 20 can be less than about 2 inches. In a further embodiment, the width dimension 16 can be less than about 8.6 inches, the height dimension 18 can be less than about 3.8 inches, and the thickness dimension 20 can be less than about 1.5 inches. In yet another embodiment, the width dimension 16 can be about 8.5 inches, the height dimension 18 can be about 3.75 inches, and the thickness dimension 20 can be about 1.38 inches.

Figure 2:
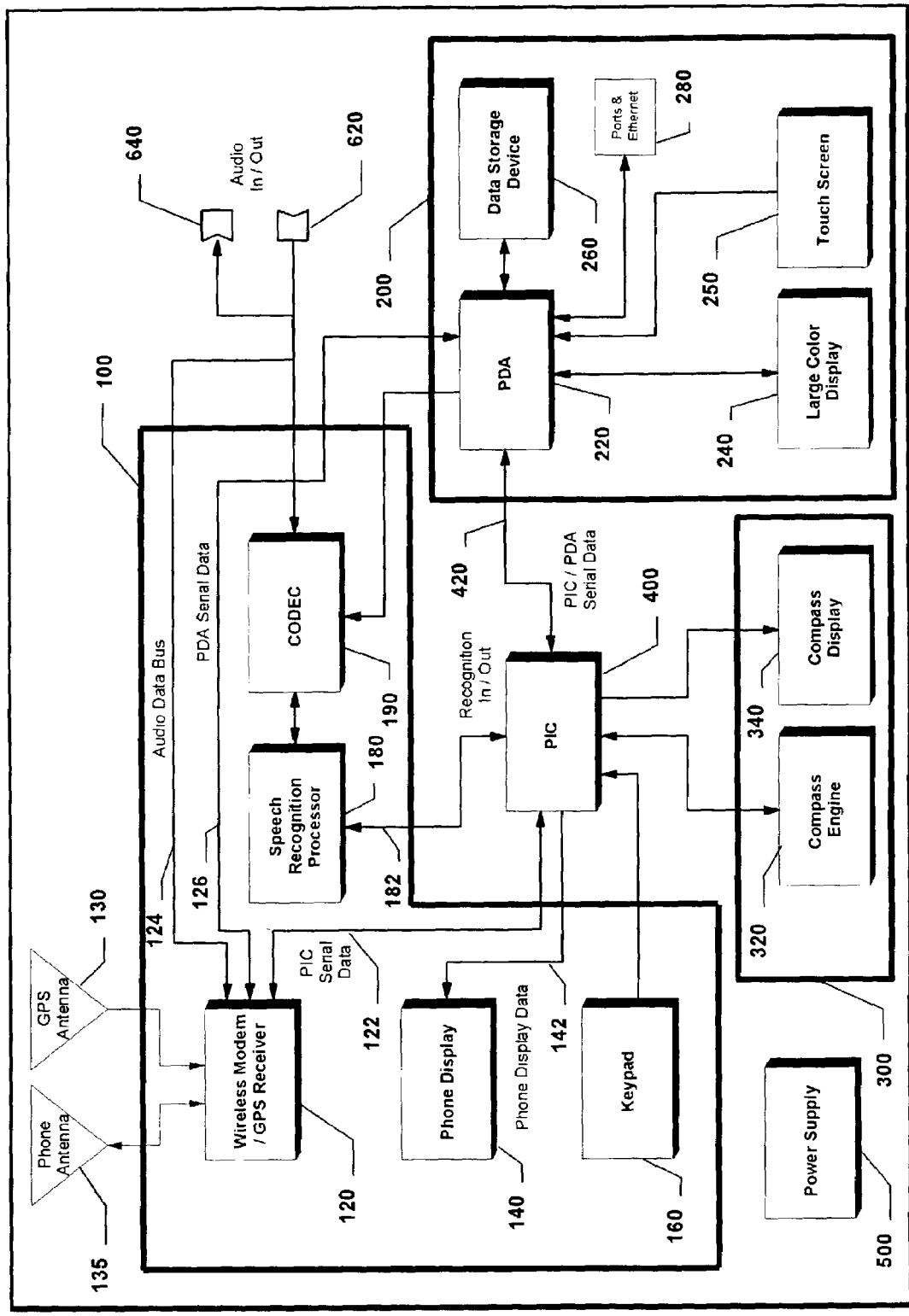
FIG. 2 is a Functional Block Diagram of a PNCS configured in accordance with an embodiment of the invention.

The Functional Block Diagram of FIG. 2 shows one embodiment with one set of compatible options. Other options available for the creation of other embodiments will be described though they are not specifically shown in the figures.

Referring to FIGS. 1 and 2 together, in one aspect of this embodiment, the PNCS 10 is comprised of four subsystems:

(1) Wireless Communication System 100,
(2) Navigation/PDA (Personal Digital Assistant) 200,
(3) Electronic Compass 300, and
(4) Power Supply 500.

The Wireless Communication System 100 can communicate with the outside world through two antennas. It can receive positioning information via a GPS Antenna 130. A Wireless Phone Antenna 135 can operate in both transmitter and receiver modes for the cellular phone circuitry within the Wireless Modem/GPS Receiver 120 module. In one embodiment, the Wireless Modem/GPS Receiver 120 is based upon a unit using the GSM protocol (Motorola G18 with Data and GPS), however, a unit using CDMA or another protocol could be functionally interchanged to address alternate markets. The Wireless Modem/GPS Receiver 120 can interface via bi-directional PIC Serial Data Bus 122 to the process controller, which can be a Programmable Interface Chip (PIC) 400, which can be a RISC-based micro-controller, and through PDA Serial Data Bus 126 to the PDA 220. An Audio Data Bus 124 can connect to the Microphone 620 and to a Speaker 640.

In another aspect of this embodiment, the Phone Display 140 is fed data from a PIC 400 on Phone Display Data Bus 142 in response to data supplied from PIC Serial Data Bus 122. This same path can be used to control the brightness of the Phone Display 140 which is implemented as a monochrome, 64×80 pixel, STN (Super Twisted Nematic) display, part number TM86CDC made by Tianma. This display is capable of presenting text and low-resolution graphics. This Phone Display 140 is used to display standard wireless telephone information including Caller ID, Call Waiting ID and other features that may be available by subscription.

In another aspect of this embodiment, a Keypad 160 connects to the PIC 400 and is associated with telephone functions. In other embodiments, the PIC 400 can be programmed to associate the Keypad 160 with the PDA 220 as well.

A Speech Recognition Processor 180 can be an ISD-SR3000 assisted by W26L010AT Memory from Winbond Electronics Corporation, and can operate in two modes. In both modes the Speech Recognition Processor 180 can be assisted by a CODEC 190 (Coder/Decoder), which can be a Motorola MC145481. In the first mode, it can receive textual data from the PIC 400 via Recognition In/Out Bus 182 and generates voiced responses to be audibly presented to the user via the Audio Data Bus 124. In the second mode, the Speech Recognition Processor 180 can analyze audio content received on the Audio Data Bus 124 and convert it to the equivalent of a textual data stream. The audio output can be amplified to necessary signal levels for the cell phone by an amplifier (not shown) on the output side of the Audio Data Bus 124.

From the Wireless Communication System 100, as represented in FIG. 1 by the Phone Antenna 135 and the Phone Display 140, on the left-hand side, we move to the Navigation/PDA 200, which can be housed on the right-hand side of the enclosure. The most visually prominent portion of this section, and of the product itself, is the Large Color Display 240, which can be made by Sharp as LQ038Q5DR01. This is a color, 320 by 240 by 3, HR-TFT (High Resolution, Thin Film Transistor) display. It is capable of presenting text and high resolution graphics in a full range of 65K colors in response to standard video driver software. The display area is pixel-wise equivalent to ¼-VGA, that is, one-fourth of the image area of a standard full-size PC monitor. The Large Color Display 240 is mounted in conjunction with a Touch Screen 250 (3M Corp. #RES-3.8-FG4) to sense user input, generally by means of a stylus, for the PDA 220. Most input to the PDA 220 comes through the Touch Screen 250 using techniques that are well-known in relation to such components.

The PDA 220 in one embodiment is a SH7727 made by the Logic Product Development Company. It runs the Microsoft Windows CE operating system. The Wireless Modem/GPS Receiver 120, via its PDA Serial Data Bus 126, feeds GPS information to the PDA 220 for processing. The Large Color Display 240 can be used to display mapping information created by a GPS application running on the PDA 220.

The industry standard interfaces supported by the PDA 220 for a Data Storage Device 260 can include Compact Flash and PCMCIA. Since these provide for removable devices, several options are accommodated based upon preferences of the user. In another instance, it might be preferred to use the PCMCIA connection for a disk-like device. One currently available example of such a device is the DataPlay Disk, similar to a miniature Compact Disc, provided by DataPlay, Incorporated with a capacity of 500 MB. Another device that might serve the user well is a 1 GB Microdrive from IBM. These provisions for Data Storage Device 260 may be used to store data for maps to be used in conjunction with GPS navigation, to provide music, to update or install newer application programs, or for many other purposes as known to developers and users of personal computing systems.

Other of industry standard interfaces can be supported by the PDA 220 and are related to the Ports and Ethernet 280 block. Standard Serial Ports as well as USB Ports can be accommodated for connection to peripheral devices, such as a printer. A PS/2 Port allows for connection of a standard mouse and keyboard. For access to the Internet or to an intranet, a connection in compliance with the Ethernet protocol, including VOIP, can be supported and browser applications running on the PDA 220 can provide the user interface. Also supported can be a "Bluetooth" 802.11b interface that provides short-range wireless protocol capability to connect with other Bluetooth devices. With the variety of hardware devices available for connection to a computer through these standard interfaces, many configurations are apparent. One use of the PNCS 10 can be as a "wireless bridge" wherein one or more network-capable devices are connected locally, using Ethernet or Bluetooth connections provided by the Ports and Ethernet 280 block, through the PDA 220 and the Wireless Modem/GPS Receiver 120 to the Internet or another remote device.

With its standard operating system, the PDA 220 is capable of running many standard applications. An Address and Phone Book program may be used to select a phone number to be dialed by sending appropriate control signals directly to the Wireless Communication System 100. From the same internal database an address may also be looked up and provided to a Mapping program to retrieve a set of directions for traveling to the desired destination. Those directions may be displayed on the Large Color Display 240 as a list or in a map format. In an automotive environment a Radar Detector may be connected to an external port with radar indications shown in a manner similar to the GPS navigation information. In an entertainment mode the Data Storage Device 260 may hold an MP3 or other audio disk for playing music while the Large Color Display 240 shows music descriptions and a virtual Control Panel for the player.

In another aspect of this embodiment, the PDA 220 can be controlled by a master process controller PIC 400 with which process control information is exchanged on the PIC/PDA Serial Data Bus 420. The PIC 400 can be a custom-programmed PIC16C74A RISC-based Programmable Interface Chip from Microchip Technology Inc., which operates as a master dispatcher to handle all data transfers between:
  (a) Phone Display 140,
  (b) Speech Recognition Processor 180,
  (c) Wireless Modem/GPS Receiver 120,
  (d) Compass Engine 320, and
  (e) Compass Display 340.
Information from these devices that is intended for the Large Color Display 240 is generated by the PIC 400 and transferred over the PIC/PDA Serial Data Bus 420 to the PDA 220 which drives the display 240. Although both the PIC 400 and PDA 220 have their own physical memory, it can be treated logically as shared memory to enable mapping to various functions as needed by the PNCS 10 subsystems and determined by the PIC 400.

Under control of the PIC 400, the Electronic Compass 300 can work in conjunction with the GPS subsystem to provide for determination of direction (heading) when, for instance, the presence of tall buildings interferes with reception from satellites. The Compass Engine 320 of one embodiment is implemented as a program in the PIC 400 microcontroller relying on inputs from a two-axis Model KMZ52 compass module and a single-axis Model KMZ51 compass module, both made by Philips. This yields a three-axis (X, Y, Z) compass that recognizes tilt.

When the PNCS 10 is used in association with a moving object, such as a vehicle or walker, position information may be obtained at intervals so that the direction of travel can be determined. In this manner, the GPS can be used in a compass-like mode to indicate direction of travel. However, when the PNCS 10 is stationary, or traveling at less than about 4 MPH, that method of determining direction by itself may become inaccurate or unavailable. By combining the ever-present heading information from the Compass Engine 320 with the current position from the GPS subsystem, those skilled in the art of navigation will understand that an indication of the direction of travel can be maintained even at low speeds.

It will be appreciated that, with embodiments of the present invention, even when a user is standing still, a heading may be determined by the Compass Engine 320 under control of the PIC 400, and that heading may be utilized to "scroll" the map displayed by the PDA 220 on the Large Color Display 240 in a direction relative to the heading. In all cases the Compass Engine 320 allows the PIC 400 to determine a heading and then to drive the Compass Display 340 to indicate that heading even when a user is standing still.

In one embodiment of the invention, the Speech Recognition Processor 180 with its related components is controlled by the PIC 400 to provide a hands-free, voice-activated, speech-controlled user interface to the PNCS 10. The speech interface mimics input from the Keypad 160 and textual input through the Touch Screen 250. This hands-free interface contributes significantly to ease of use of the system while improving user safety, especially when operating a motor vehicle since the user need not look away from the road. Since the PNCS 10 operates as a speakerphone, it also distances the cell phone antenna from the user's head, thereby alleviating health concerns.

All functions of the PNCS 10 are available under speech control. In a first example, the user may activate a phone call by voicing instructions to dial a phone number. The spoken commands may indicate a phone number directly, or indirectly by reference to a name in an address and phone book stored within the unit and accessed by the PDA 220, or looked up online through the interface to the Internet. The PNCS 10 in a second example assists the user to navigate to a desired destination entirely by voice through processes that are known in the art. In one such process the user requests instructions for travel to a destination, for example, by speaking, "Guide me to the office." The system would then look up the address of the office, or ask for a street address if it was not previously known. Since the GPS subsystem provides the PNCS 10 with its own location at all times, retrieval of route information from a local database, or from the Internet, can be used with a mapping application running on the PDA 220 to call out the turns to the user who is driving a vehicle. Other speech-controlled applications allow the user to read or write email, and to check or update schedules on a calendar. These and other speech-controlled, voice-response applications have been described in the prior art.

In a further aspect of this embodiment of the invention, in its position of master control, the PIC 400 knows the status of the Large Color Display 240, even though that display is driven by the PDA 220. When the Large Color Display 240 is not being used to display applications running on the PDA 220, the PIC 400 may choose that display, since it is larger, to present information that would normally be sent to the smaller Phone Display 140. The PIC 400 may also send phone information to the Large Color Display 240 in an automatic fail-over mode any time that the Phone Display 140 is detected to be in a Not Ready state, such as due to a failure or any other Busy condition. On the other hand, if only the phone is in use, the PIC may place the PDA 220 and its Large Color Display 240 into standby mode to conserve power when running solely on the internal battery.

Under normal operation when all subsystems are in use, the Phone Display 140 can be dedicated to phone information and the Large Color Display 240 will handle the more complex graphical presentations associated with various applications running on the PDA 220. This provides the user with the ability to view, compose, and send email or to view mapping information related to the GPS, on a larger, easier to view screen, while allowing the phone to be used at the same time.

In its present embodiment of the invention, the PNCS 10 is operational from a mounting on or in the dashboard of a motor vehicle where accessory power may be supplied via standard connectors. Its size, form factor and weight, along with self-contained batteries also allow it to be carried in a coat pocket or as a hand-held device for standalone use away from vehicles or other power sources.

Although the present invention refers specifically to the employment of signals transmitted by the known GPS satellite network, it can be appreciated that if a further satellite network for carrying out the same or similar functions is placed into orbit around the earth, that signals transmitted by the new network could be similarly employed. In particular, due to the modular construction of embodiments of the invention, it is possible that a module having newer functionality could be plugged into existing units of the present invention and would be supported by an update to the associated application software. Such an update would be available either through the removable mass storage device or as a download using a built-in communication port or from the Internet.

The description of embodiments of the invention is not intended to be exhaustive or to limit the invention to the precise form disclosed. While specific embodiments of, and examples for, the invention are described here for illustrative purposes, various equivalent modifications are possible within the scope of the invention, as those skilled in the relevant arts will recognize. For example, while functions are presented in a given order, alternative embodiments may perform functions in a different order, or functions may be performed substantially concurrently. The teachings of the invention provided here can be applied to other systems, not only the system described here. Those with skills in the related arts will also recognize that the manufacturer's data sheets for the components specifically referenced here will enable such a person to construct systems that are similar to those disclosed here and that the various embodiments described here can be combined to provide further embodiments.

Although specific circuitry is described above, those or ordinary skill in the art will recognize that a micro processor-based system could also be used to where any logical decision are configured in software. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. All of the above U.S. patents and applications and other references described above are incorporated herein by-reference.

These and other changes can be made to the invention in light of the above detailed description. In general, the terms used in the following claims should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention. Further, the invention is not limited, except as by the following claims.

We claim:

1. A portable navigation and communication system within a single enclosure, comprising:
  (a) means of position and heading determination including:
    a Satellite Positioning System;
    a first Display; and
    an Electronic Compass for sensing directional heading data that are displayed on said first Display;
  (b) mobile telephone means including:
    a second Display;
    a Keypad for entering instructions and data that are displayed on said second Display; and
    a means of transmitting and receiving wireless telephone signals containing audio and data;
  (c) means for personal computing including:
    a Personal Digital Assistant means electronically connected to said mobile telephone means,
    said Personal Digital Assistant means comprising:
    a first memory device for storing a set of application software programs;
    a second memory device for storing a set of data; and
    a Processor for performing operations with said set of data utilizing said set of application software Programs;

and a third Display, separate and unique from said second Display, in electrical connection with said Personal Digital Assistant means for display of output produced as a result of said set of application software programs operating on said set of data, said third Display having a Touch Screen;

(d) a Controller means being electrically connected to said means of position and heading determination, to said mobile telephone means, and to said means for personal computing; and having a third memory device for storing a set of control software programs;

(e) a Power Supply for providing electrical power to said means of position and heading determination, to said mobile telephone means, to said personal computing means, and to said Controller means; and (f) a Speech Generator, said Controller means capable of causing said Speech Generator to output the voice equivalent of text prepared for display on any of said first Display, said second Display, or said third Display.

2. The portable navigation and communication system as described in claim 1 further comprising a Speech Recognition Unit, said Controller means capable of accepting data from said Speech Recognition Unit and treating said data from said Speech Recognition Unit as if it had been received from said Keypad or from said Touch Screen.

3. The portable navigation and communication system as described in claim 2 further comprising a removable Data Storage Device having an industry standard interface wherein information may be retrieved from and stored to said Data Storage Device in transfers, respectively, to or from said first memory device, said second memory device, and said third memory device.

4. The portable navigation and communication system as described in claim 3 wherein said means for personal computing is capable of operation with an Open Source operating system.

5. The portable navigation and communication system as described in claim 3 wherein said means for personal computing is capable of operation with an industry standard operating system.

6. The portable navigation and communication system of claim 5 wherein said industry standard operating system is a version of Microsoft Windows CE.

7. The portable navigation and communication system of claim 6 wherein said set of application software programs includes programs that run on all personal computers.

8. The portable navigation and communication system of claim 7 wherein information intended for presentation on said second Display may instead be presented on said third Display if said second Display is in a Not Ready state.

9. The portable navigation and communication system of claim 8 wherein said Personal Digital Assistant means has a connection port to a network.

* * * * *